United States Patent
Ohsawa

[11] Patent Number: 5,561,492
[45] Date of Patent: Oct. 1, 1996

[54] CAMERA SYSTEM USING REMOTE CONTROL UNIT

[75] Inventor: Keiji Ohsawa, Tokyo, Japan

[73] Assignee: Nikon Corporation, Tokyo, Japan

[21] Appl. No.: 291,507

[22] Filed: Aug. 18, 1994

Related U.S. Application Data

[63] Continuation of Ser. No. 126,392, Sep. 24, 1993, abandoned.

[30] Foreign Application Priority Data

Sep. 25, 1992 [JP] Japan .................. 4-256101
Sep. 16, 1993 [JP] Japan .................. 5-221003

[51] Int. Cl.⁶ .................. G03B 7/08; G03B 13/36
[52] U.S. Cl. .................. 396/56; 396/121; 396/234
[58] Field of Search .................. 354/402, 432, 354/410, 403, 266; 348/211, 212, 214

[56] References Cited

U.S. PATENT DOCUMENTS

| | | | |
|---|---|---|---|
| Re. 31,370 | 9/1983 | Mashimo et al. | 354/402 |
| 3,518,927 | 7/1970 | Mehlitz | 354/266 X |
| 4,075,640 | 2/1978 | Ueda et al. | 354/432 |
| 4,614,975 | 9/1986 | Kaite | 354/402 X |
| 4,816,855 | 3/1989 | Kitaura | 354/266 X |
| 5,051,770 | 9/1991 | Cornuejols | 354/432 |
| 5,121,152 | 9/1992 | Wagner | 354/402 |
| 5,198,849 | 3/1993 | Hirai | 354/410 |
| 5,235,376 | 8/1993 | Inoue et al. | 354/403 |
| 5,361,115 | 11/1994 | Ohtsuka et al. | 354/400 |

FOREIGN PATENT DOCUMENTS

| | | |
|---|---|---|
| 61-53614 | 3/1986 | Japan . |
| 62-175723 | 8/1987 | Japan . |
| 64-35430 | 2/1989 | Japan . |
| 4-119340 | 4/1992 | Japan . |

Primary Examiner—W. B. Perkey

[57] ABSTRACT

A camera body incorporates an information detecting portion for detecting respective pieces of information on photography with respect to a plurality of areas within a photographing picture and an information selecting portion for selecting specific pieces of information from plural pieces of information. A remote control unit incorporates an area designating portion for designating an arbitrary area among the plurality of areas irrespective of a position of the remote control unit. The information selecting portion is constructed to select the information on the area designated by the area designating portion.

33 Claims, 5 Drawing Sheets

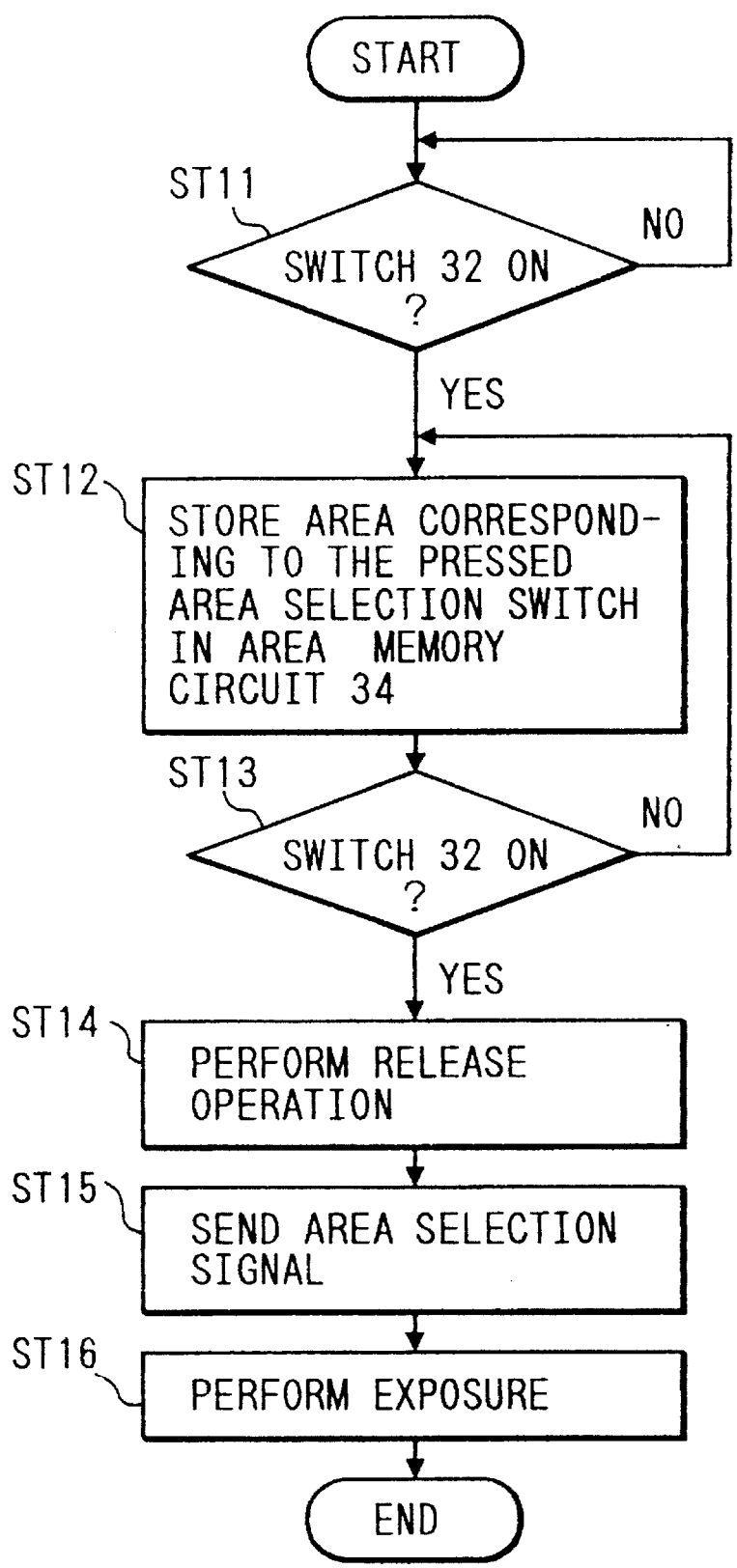

CAMERA SYSTEM USING REMOTE CONTROL UNIT

This is a continuation of application Ser. No. 08/126,392, filed Sep. 24, 1993, now abandoned.

BACKGROUND OF THE INVENTION

1. Field of the Invention

The present invention relates to a camera system capable of performing remote control.

2. Related Background Art

A conventional camera system is disclosed in, e.g., Japanese Patent Application Laid-Open No. 62-175723. This camera system comprises a camera body having a reception portion and a remote control unit including a release portion, a transmission portion and a power supply. The remote control unit is attachable to and detachable from the camera body. According to this invention, the remote control unit is demounted from the camera body when performing the remote photography. Releasing of the camera can be effected in a position apart from the camera by depressing a release button provided on the remote control unit.

If this camera is an autofocus camera, when the photographer tries to take a shot of himself (or herself) by the remote photography, the photographer has to recognize that the subject, i.e., the photographer himself, is positioned in a range-finding area of the camera.

Under such circumstances, according to the invention disclosed in Japanese Patent Application Laid-Open No. 64-35430, a remote control unit is provided with a positional recognition indicating means. A position recognizing indication is given when the photographer (more precisely the remote control unit) enters the range-finding area of the camera. The photographer is thus informed of this entrance. The photographer can thereby recognize that the subject, viz., the photographer himself, is positioned in the range-finding area of the camera.

Further, Japanese Patent Application Laid-Open No. 61-53614 discloses a camera in which distances of a plurality of areas of the picture are measured, and a position of the principal subject is presumed from pieces of distance information of the respective areas. In this camera, a range-finding result at the closest or farthest distance is selected based on luminance information from the range-finding results of the respective areas, thereby adjusting a focal point. That is, the principal subject is positioned at the closest distance in the ordinary portrait photography. Whereas in the scenic photography, the principal subject is positioned at the farthest distance. A range-finding result at the closest or farthest distance is selected by utilizing this characteristic, thereby adjusting the focal point.

SUMMARY OF THE INVENTION

There arises, however, the following problem inherent in the conventional camera in which the photographer can recognize that the subject, i.e., the photographer himself, is positioned in the range-finding area. There can be taken only a photo where the photographer is positioned in a preset range-finding area. Namely, according to the camera in which the central part of the picture is set as a range-finding area, the problem is that only the photo of the photographer positioned at the center of the picture can be taken.

The following problem is also induced in the camera where the position of the principal subject is presumed from the distance information of the respective areas. It can be sufficiently considered that a tree or a building happens to exist in a position closer to the camera than the photographer when photographed. In this case, however, there is caused such a problem that not the photographer himself but the tree or the building is focused. In this instance also, the following problem is produced. The range-finding area is manually selectable. When trying to take a shot once again by changing the self-position after the previous photographing, however, the photographer has to go back to the camera position to manually select the range-finding area and again return to the photographing position. The operation to change the self-position is extremely troublesome.

Accordingly, it is a primary object of the present invention, which has been devised in view of the problems given above, to provide a camera system capable of photographing through optimum photographing information even when the subject is positioned in any area among a plurality of areas within a photographing picture.

To accomplish this object, there is provided a camera system comprising a camera body and a remote control unit capable of communications with the camera body. The camera body includes an information detecting means for detecting pieces of information on photography in a plurality of areas within a photographing picture. The camera body also includes an information selecting means for selecting specific pieces of information from the plural pieces of information. The remote control unit includes area designating means for designating an arbitrary area or arbitrary areas among the plurality of areas irrespective of an existing position of the remote control unit. The information selecting means is constructed to select the information of the area designated by the area designating means.

According to the camera system of this invention, the photographing information of the plurality of areas within the photographing picture is selected by the information detecting means. The information selecting means selects the optimum photographing information. It is therefore possible to take a shot in accordance with the optimum photographing information even when the subject is positioned in any area among the plurality of areas within the photographing picture.

BRIEF DESCRIPTION OF THE DRAWINGS

Other objects and advantages of the present invention will become apparent during the following discussion in conjunction with the accompanying drawings, in which:

FIG. 8 is a flowchart showing the second embodiment of the camera system of this invention.

DESCRIPTION OF THE PREFERRED EMBODIMENTS

Embodiments of the present invention will hereinafter be described with reference to the drawings.

Figure 1:
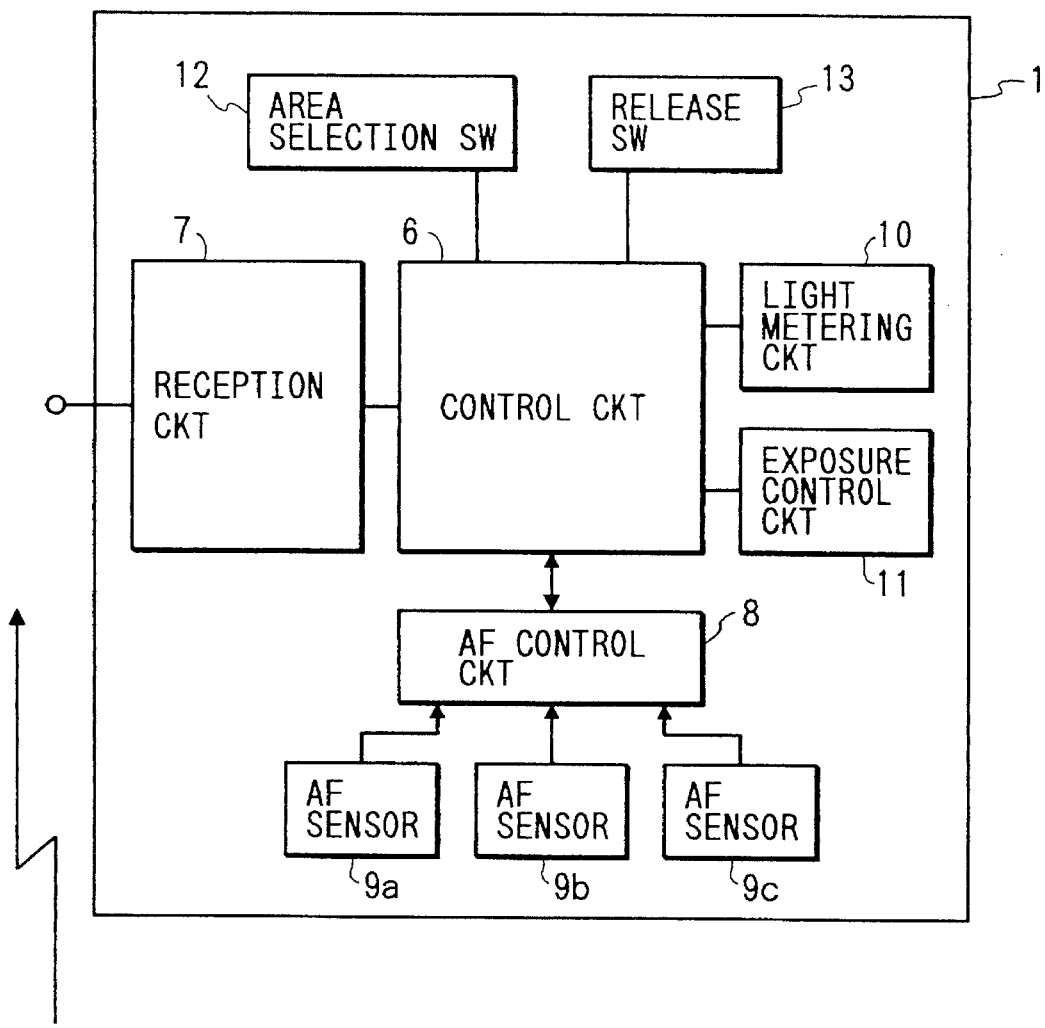
FIG. 1 is a block connection diagram showing a first embodiment of a camera system according to the present invention.

FIG. 1 is a block connection diagram showing a first embodiment of a camera system according to the present invention.

Figure 3:
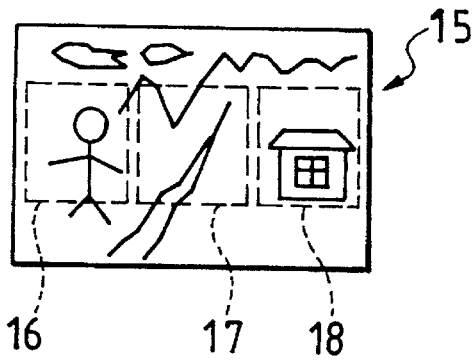
FIG. 3 is a plan view illustrating a first embodiment of the camera system of this invention.

Referring to FIG. 1, a reception circuit 7 for receiving a signal transmitted by a remote control unit 2 is connected to a control circuit 6 of a camera body 1. Connected also to the control circuit 6 are an autofocus control circuit 8 for effecting a focal adjustment of a photographing lens and a light metering circuit 10 for measuring an exposure of a photographing picture. An exposure control circuit 11 for controlling an aperture and a shutter speed is further connected to the control circuit 6. Three autofocus sensors 9a–9c are connected to the autofocus control circuit 8. Based on a distance signal outputted by any one of the autofocus sensors 9a–9c, the autofocus control circuit 8 controls the focal adjustment and a releasing action. The photographing picture is, as illustrated in FIG. 3, partitioned into three parts. The autofocus sensors 9a–9c output, to the autofocus control circuit 8, distance signals corresponding to distances of the respective areas to a subject. The autofocus control circuit 8 performs the focal adjustment and the releasing action on the basis of the distance signal outputted by any one of the autofocus sensors 9a–9c in accordance with a selection control signal supplied from the control circuit 6.

A transmission circuit 4 for transmitting a remote control signal and three release switches 5a–5c are connected to the control circuit 3 of the remote control unit 2. When turning on any one of the release switches 5a–5c, the control circuit is informed of its being turned on via the transmission circuit 4 and the reception circuit 7 as well. The control circuit 6 transmits, when the release switch 5a is turned on, the selection control signal to the autofocus control circuit 8 to perform range finding on the basis of the distance signal outputted by the autofocus sensor 9a. Similarly, the control circuit 6 transmits, when the release switch 5b is turned on, the selection control signal to the autofocus control circuit 8 to effect the range finding on the basis of the distance signal outputted by the autofocus sensor 9b. The control circuit 6 transmits, when the release switch 5c is turned on, the selection control signal to the autofocus control circuit 8 to execute the range finding on the basis of the distance signal outputted by the autofocus sensor 9c. The autofocus control circuit 8 performs the range finding and the releasing action on the basis of the distance signal outputted by any one of the autofocus sensors 9a–9c in accordance with the selection control signal supplied from the control circuit 6.

Note that the area selection and the releasing action are, if not photographed under the remote control, performed by manipulating an area selection switch 12 and a release switch 13 of the camera body 1.

Figure 2:
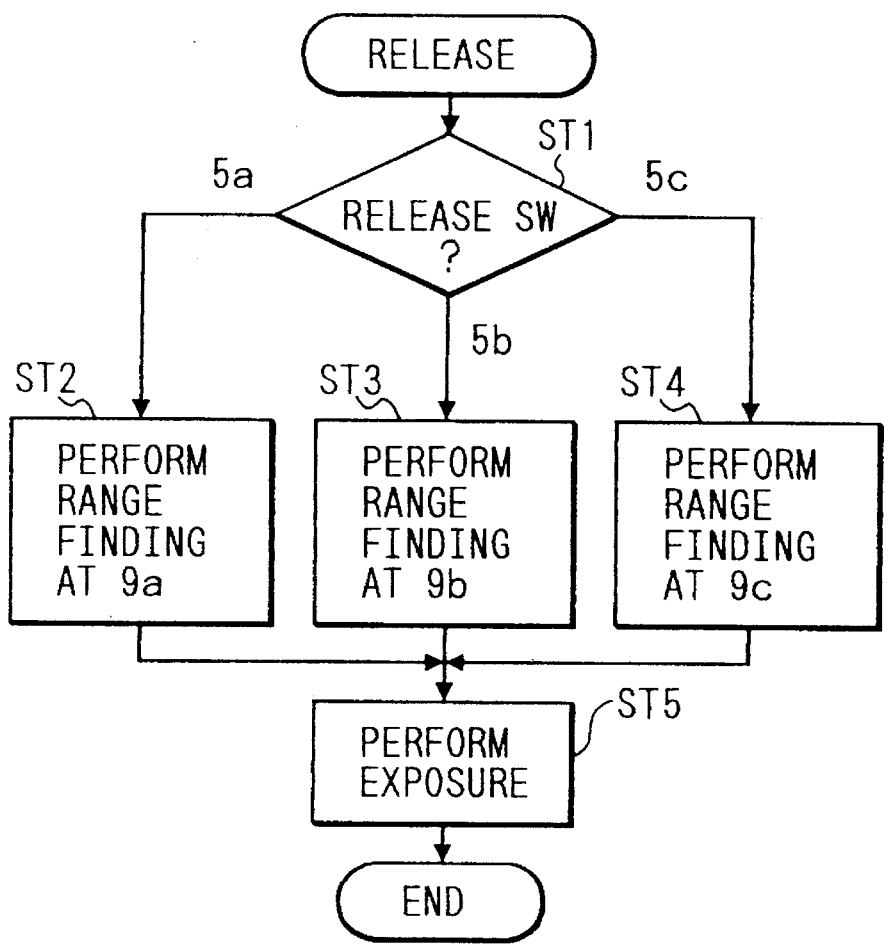
FIG. 2 is a flowchart showing a first embodiment of the camera system of this invention.

FIG. 2 is an explanatory flowchart showing how the control circuit operates when photographed under the remote control.

A program starts running with turn-on of any one of the release switches 5a–5c. The control circuit 6 at first judges which of the release switches 5a–5c has been turned on (step ST1). When the release switch 5a is turned on, the control circuit 6 transmits the selection control signal to the autofocus control circuit 8 to effect the range finding on the basis of the distance signal outputted by the autofocus sensor 9a (step ST2). Similarly, when the release switch 5b is turned on, the control circuit 6 transmits the selection control signal to the autofocus control circuit 8 to perform the range finding on the basis of the distance signal outputted by the autofocus sensor 9b (step ST3). When the release switch 5c is turned on, the control circuit 6 transmits the selection control signal to the autofocus control circuit 8 to execute the range finding on the basis of the distance signal outputted by the autofocus sensor 9c (step ST4).

The autofocus control circuit 8 performs the range finding on the basis of the distance signal outputted by any one of the autofocus sensors 9a–9c in accordance with the selection control signal supplied from the control circuit 6. The autofocus control circuit 8 thereafter controls the aperture and the shutter speed by controlling the exposure control circuit 11 (step ST5) and the releasing action as well. A single release sequence is thus ended.

FIG. 3 illustrates on-picture areas the distances to which are measured by the autofocus sensors 9a–9c. A picture 15 indicated by the solid line is defined as a whole field. Three areas 16–18 indicated by broken lines correspond respectively to the autofocus sensors 9a –9c.

Figure 4:
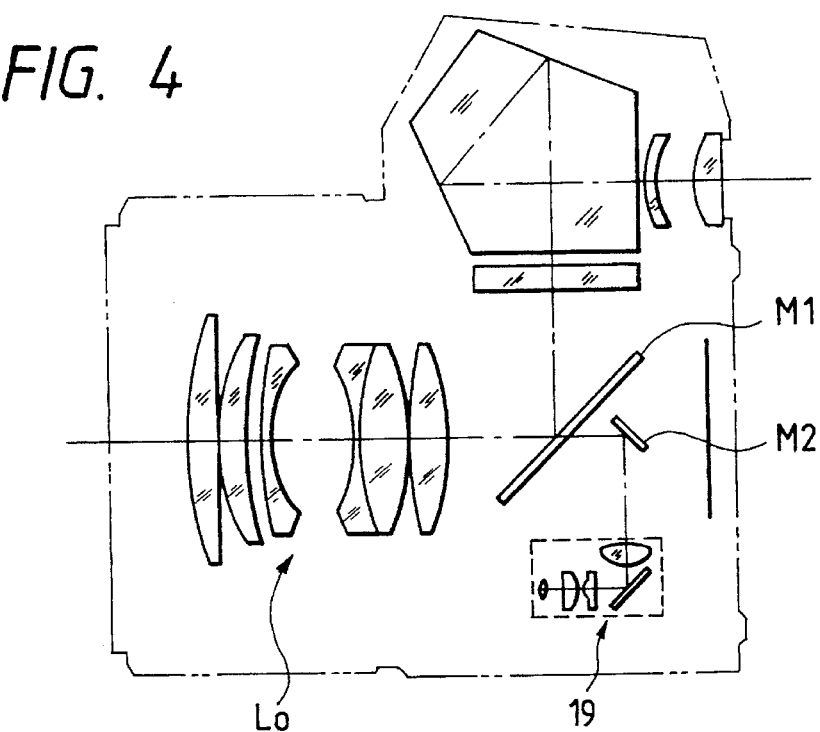
FIG. 4 is a sectional view illustrating a first embodiment of the camera system of this invention.
Figure 5:
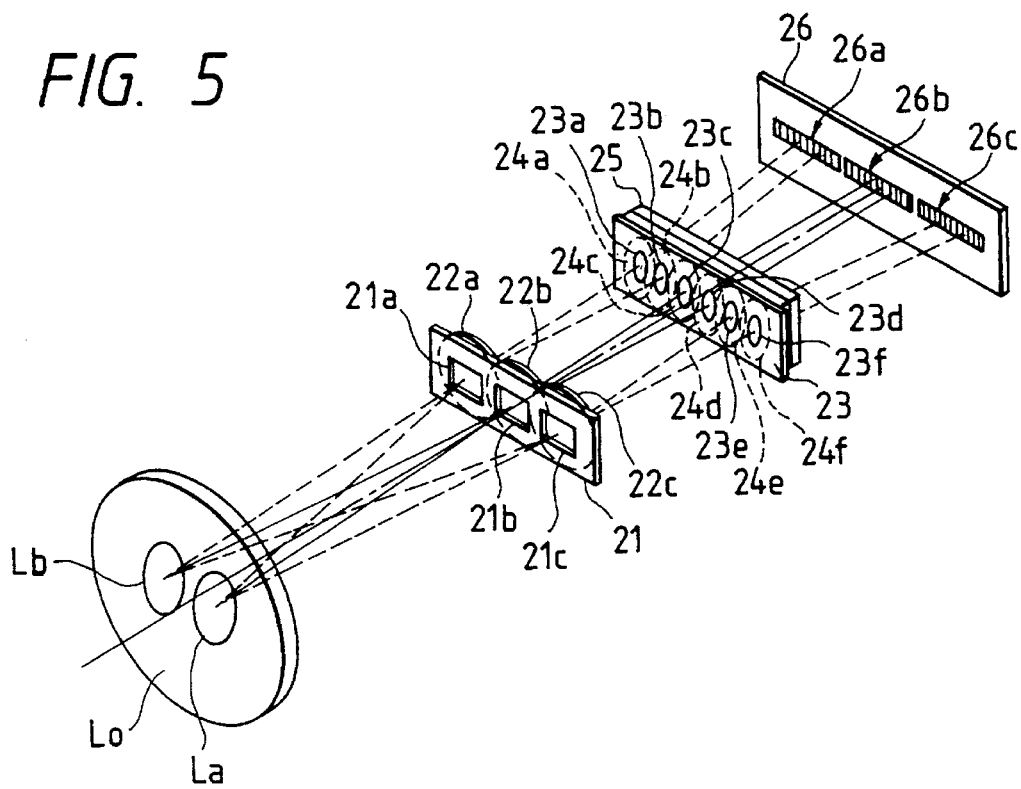
FIG. 5 is a perspective view showing a first embodiment of the camera system of this invention.

FIGS. 4 and 5 are sectional and perspective views showing a focus detecting apparatus having a plurality of focus detection areas and employed for a single-lens reflex camera.

Turning to FIG. 4, a part of light passing through a photographing lens L0 penetrates a half-mirror M1. The light then is reflected by a submirror M2 and falls on a focus detection module 19. The focus detection module 19 is constructed as illustrated in FIG. 5.

Referring to FIG. 5, the focus detection areas 16–18 (see FIG. 3) are defined by field masks 21a–21c disposed immediately after a primary focal plane of the photographing lens L0. Disposed on the field masks 21a– 21c are condenser lenses 22a–22c, pairs of aperture masks 23a–23f and pairs of reimaging lenses 24a–24f. Beams of light traveling through different areas La–Lb on a pupil plane of the photographing lens L0 are reimaged on light receiving portions 26a–26c of the autofocus sensors 9a–9c. Distance information is obtained from outputs of the light receiving portions 26a–26c according to beam distributions thereof.

The focus detection area 16 shown in FIG. 3 corresponds to the field mask 21a. It therefore follows that the range finding is performed based on a signal from the light receiving portion 26a when measuring a distance of the focus detection area 16. Similarly, the focus detection area 17 corresponds to the field mask 21b. Hence, it follows that the range finding is performed based on a signal from the light receiving portion 26b when measuring a distance of the focus detection area 17. The focus detection area 18 corresponds to the field mask 21c. It therefore follows that the range finding is performed based on a signal from the light receiving portion 26c when measuring a distance of the focus detection area 18.

Figure 6:
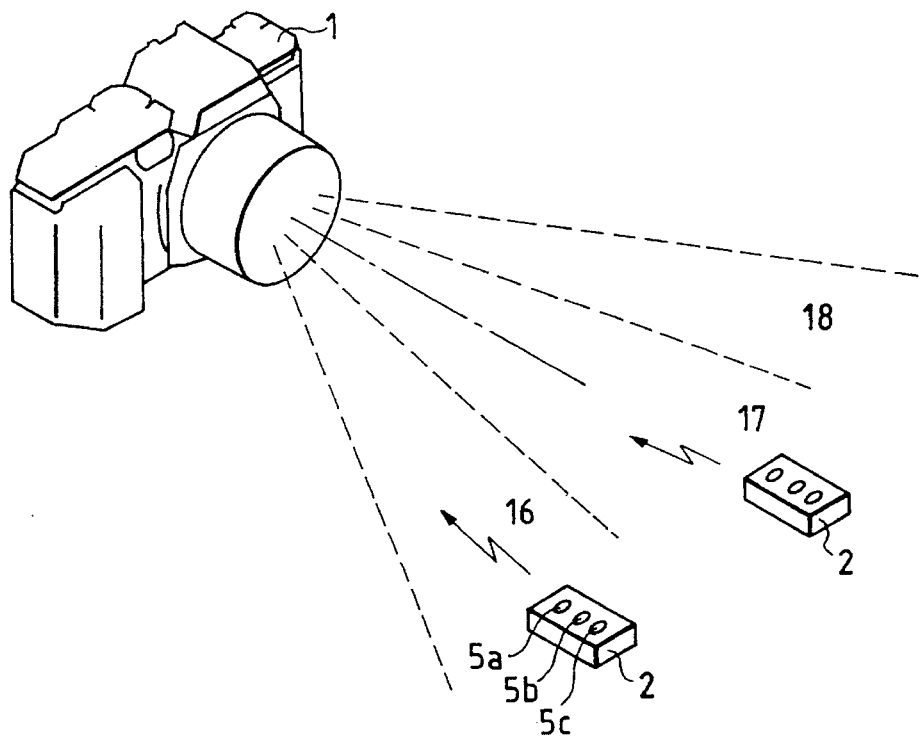
FIG. 6 is a perspective view showing a first embodiment of the camera system of this invention.

FIG. 6 is an explanatory perspective view showing a state where the remote control unit 2 of the camera system according to this invention is employed.

The focus detection areas 16–18 explained referring to FIG. 3 are, as indicated by the broken lines in FIG. 6, imagined as three areas. The photographer simply depresses any one of the release switches 5a–5c of the remote control unit 2 while standing in any area among the focus detection areas 16–18. The photographer as a subject can thereby take a shot of himself. For instance, when the photographer stands in the focus detection area 17, it is possible to take a shot in focus on himself simply by depressing the release switch 5b of the remote control unit 2. Further, when standing on the left side as viewed in the direction of the camera body 1, it is feasible to take a photo in focus on the photographer himself who stands on the left side in the direction of the camera body 1 simply by depressing the release switch 5a.

Besides, when selecting the release switch in a non-existence area of himself, it is possible to take a shot in focus on a subject existing in that area. More specifically, the remote control unit 2 incorporates a function to select the area, and, therefore, the area to be focused can be arbitrarily selected irrespective of an existing position of the remote control unit 2.

Figure 7:
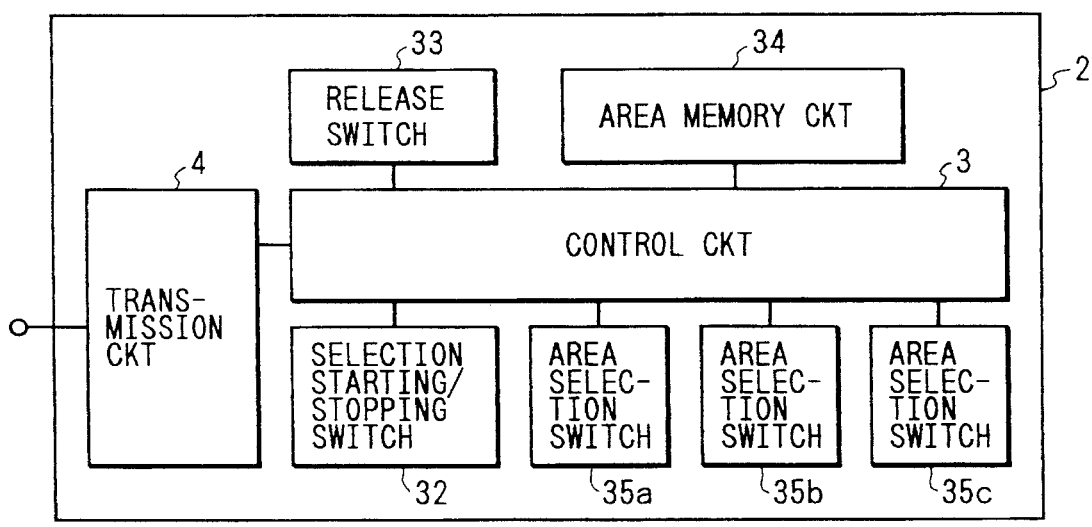
FIG. 7 is a block connection diagram illustrating a second embodiment of the camera system according to the present invention.

FIG. 7 is a block connection diagram showing a second embodiment of the camera system according to this invention. Herein, the camera body is the same as that shown in FIG. 1 and therefore omitted. Only components of the remote control unit are illustrated. An arrangement in this example is that a plurality of areas desired are selectable by the remote control.

Connected to the control circuit 3 are a single release switch 33, area selection switches 35a–35c, a selection start/end switch 32 and an area memory circuit 34 instead of the release switches 5a–5c of FIG. 1. FIG. 8 is an explanatory flowchart showing actions of the control circuit 6 when the area is selected by the thus constructed remote control unit.

For selecting the area, to begin with, whether or not the selection start/end switch 32 is turned on is judged (step ST11). When turned on, the operation enters an area selection mode. When turning on any (one or a plurality) of the area selection switches 35a through 35c in the area selection mode, the area corresponding to the switch manipulated is stored in the area memory circuit 34 (step ST12). When the area selection is finished, the selection start/end switch 32 is manipulated once again. The area selection mode comes to an end but continues while the switch is not turned on (step ST13). Thereafter, the release switch 33 is turned on (step ST14). A selection signal is transmitted to the autofocus control circuit 8 on the side of the camera body so that the range finding is effected based on a distance signal outputted by the autofocus sensor corresponding to the area stored in the area memory circuit 34 (step ST15).

The autofocus control circuit 8, after performing the range finding by use of the output of the autofocus sensor corresponding to the transmitted signal, executes an exposure action (step ST16). A single release sequence is thus finished.

In this case, where only one area is selected by manipulating the area selection switch, the actions are the same as those in the first embodiment. For instance, only the area selection switch 35c is turned on in the area during the area selection mode. In this instance, the selection control signal is transmitted to the autofocus control circuit 8 on the side of the camera body so that the range finding is performed based on the output of the autofocus sensor 9c.

If two area selection switches, e.g., 35a and 35b among the three switches are selected, the selection control signals are transmitted to the camera-body-side autofocus control circuit so that the range finding is effected based on the outputs of the autofocus sensors 9a, 9b. At this time, there is not herein particularly limited the way of performing the range finding by use of the outputs of the plurality of autofocus sensors in the camera body. However, as disclosed in, e.g., preceding Japanese Patent Application Laid-Open No. 61-53614, the way of using the sensor giving forth the closest-distance output may also be adopted. As described above, only the area of the range to be used is designated beforehand. If an unexpected subject exists at the edge of the picture at a closer distance than the principal subject, it is thereby possible to prevent the unexpected subject from being focused.

Further, if there is no such unexpected subject image, and when set to employ the range finding outputs of all the areas (turning on the switches 35a–35c), it is desirably possible to take a shot without changing the setting each time in the case of performing continuous photography while the principal subject, e.g., the photographer himself, makes an in-picture movement.

The present invention has been described so far by way of the embodiments. According to the technical ideas of this invention, however, a variety of modifications are practicable. For example, the plurality of release switches are used for selecting the range-finding areas in the embodiments discussed above. However, other selecting means such as a dial, etc. may also be employed.

Besides, in the embodiments discussed above, the range-finding areas are selected under the remote control. In a multi-partition photomerry camera where a picture is partitioned into a plurality of areas, however, the photometry areas can be selected. In this case, it is possible to take a photo with an exposure matched exactly with the principal subject without being influenced by a position of the principal subject.

Further, the explanations of the embodiments given above have been made on the assumption that the remote control unit is initially separated from the camera body. However, the remote control unit can be also constructed to separate therefrom only when performing the remote photography.

Moreover, the explanations of the embodiments given above have been made on the following assumption. The remote control unit includes the plurality of release switches corresponding to the plurality of partitioned areas. With a depression of this release switch, the photography to be conducted in accordance with the range-finding condition of any area is selected under the remote control, and, simultaneously, the releasing action is also carried out. Separate switches may be, however, provided for distinguishing the selecting action from the releasing action as different ones.

Further, the explanations of the embodiments Given above have been made on the assumption of providing the hardware for the exclusive use such as the device for partitioning the photographing picture into the plurality of areas, the devices for detecting the photographing conditions for every partitioned area and the device for selecting the photography to be conducted in accordance with the photographing condition detected by any one of the detecting devices.

It is apparent that, in this invention, a wide range of different working modes can be formed based on the invention without deviating from the spirit and scope of the invention. This invention is not restricted by its specific working modes except being limited by the appended claims.

What is claimed is:

1. A camera system comprising a camera body and a remote control unit capable of communications with said camera body, said camera system including:

a plurality of information detectors which correspond to a plurality of areas within a photographing picture and which are provided in said camera body for detecting respective pieces of information on photography in said plurality of areas;

an information selecting part, provided in said camera body, for selecting one of said pieces of information; and an area designating part, provided in said remote control unit, for designating any area among said plurality of areas irrespective of an existing position of said remote control unit, wherein said information selecting part selects a piece of information on photographing in an area designated by said area designating part.

2. The camera system according to claim 1, wherein said area designating part has a number of area designating components which correspond to said plurality of areas, respectively.

3. The camera system according to claim 2, wherein said area designating means are release switches.

4. The camera system according to claim 1, wherein each of said information detectors detects information on a distance to a subject existing in a corresponding one of said areas.

5. The camera system according to claim 4, further comprising a focalizing part, provided in said camera body, for performing focalization of a photographing lens, wherein said focalizing part performs the focalization of said photographing lens on the basis of said distance information.

6. The camera system according to claim 1, wherein each of said information detectors detects information on a luminance of a subject existing in a corresponding one of said areas.

7. The camera system according to claim 6, further comprising an exposure control part, provided in said camera body, for controlling an exposure, wherein said exposure control part controls the exposure on the basis of said luminance information.

8. A camera capable of communications with a remote control unit incorporating an area designating part for designating any area among a plurality of areas within a photographing picture irrespective of an existing position of a photographer operating the remote control unit, said camera comprising:

an information detector, including a plurality of sensors corresponding to said plurality of areas, for detecting respective pieces of information on photography in said plurality of areas; and an information selecting part for selecting a piece of information on photographing said any area designated by said area designating part.

9. A remote control unit capable of communications with a camera having an information detector provided with a plurality of sensors for detecting respective pieces of information on photography in a plurality of areas within a photographing picture, and an information selecting part for selecting any piece of information from said pieces of information, said remote control unit comprising:

an area designating part for designating any area among said plurality of areas irrespective of an existing position of said remote control unit, wherein the piece of information selected by said information selecting part is specified by the designation.

10. A camera system comprising a camera body and a remote control unit capable of communications with said camera body, said camera system including:

a plurality of information detectors which correspond to a plurality of areas within a photographing picture and which are provided in said camera body, for detecting respective pieces of information on photography in said plurality of areas;

an information selecting part, provided in said camera body, for selecting one of said pieces of information; and an area designating part provided in said remote control unit for designating at least any two areas among said plurality of areas irrespective of an existing position of said remote control unit, wherein said information selecting part selects a piece of information on photographing in an area satisfying a given condition from said at least any two areas designated by said area designating part.

11. The camera system according to claim 10, wherein each of said information detectors detects information on a distance to a subject existing in a corresponding one of said areas.

12. The camera system according to claim 11, further comprising a focalizing part for performing focalization of a photographing lens, wherein said focalizing part performs the focalization of said photographing lens based on said distance information.

13. The camera system according to claim 10, wherein each of said information detectors detects information on a luminance of a subject existing in a corresponding one of said areas.

14. The camera system according to claim 13, further comprising an exposure control part, provided in said camera body, for controlling an exposure, wherein said exposure control parts controls the exposure based on said luminance information.

15. The camera system according to claim 10, wherein said given condition is that said subject exists at the closest distance.

16. The camera system according to claim 15, further comprising a focalizing part for performing focalization of a photographing lens, wherein said focalizing part performs the focalization of said photographing lens based on said closest distance.

17. The camera system according to claim 10, wherein said given condition is that said subject exists at the farthest distance.

18. The camera system according to claim 17, further comprising a focalizing part for performing focalization of a photographing lens, wherein said focalizing part performs the focalization of said photographing lens based on said farthest distance.

19. A camera system comprising a camera body and a remote control unit capable of communications with said camera body, said camera system including:

a plurality of information detectors which correspond to a plurality of areas within a photographing picture and which are provided in said camera body for detecting respective pieces of information on photography in said plurality of areas;

an information selecting part, provided in said camera body, for selecting at least two of said pieces of information; and an area designating part provided in said remote control unit for designating at least any two areas among said plurality of areas irrespective of an existing position of said remote control unit, wherein said information selecting part selects said at least two pieces of information on photography corresponding to said at least two areas designated by said area designating part.

20. The camera system according to claim 19, wherein each of said information detectors detects information on a distance to a subject existing in a corresponding one of said areas.

21. The camera system according to claim 20, further comprising a focalizing part for performing focalization of a photographing lens, wherein said focalizing part performs the focalization of said photographing lens based on said distance information.

22. The camera system according to claim 19, wherein each of said information detectors detects information on a luminance of a subject existing in a corresponding one of said areas.

23. The camera system according to claim 22, further comprising an exposure control part, provided in said camera body, for controlling an exposure, wherein said exposure control part controls the exposure based on said luminance information.

24. A camera system comprising a camera body and a remote control unit capable of communications with said camera body, said camera system including:
   a plurality of information detectors which correspond to a plurality of areas within a photographing picture and which are provided in said camera body for detecting respective pieces of information on photography in said plurality of areas;
   an information selecting part, provided in said camera body, for selecting two of said pieces of information;
   a computing unit, provided in said camera body, for processing said at least two pieces of information selected by said selecting part in accordance with a predetermined algorithm; and
   an area designating part provided in said remote control unit for designating at least any two areas among said plurality of areas irrespective of an existing position of said remote control unit, wherein said information selecting part selects said at least two pieces of information on photography corresponding to said at least two areas designated by said area designating part.

25. The camera system according to claim 24, wherein each of said information detectors detects information on a distance to a subject existing in a corresponding one of said areas.

26. The camera system according to claim 25, further comprising a focalizing part for performing focalization of a photographing lens, wherein said focalizing part performs the focalization of said photographing lens based on a processed result of said computing unit.

27. The camera system according to claim 24, wherein each of said information detectors detects information on a luminance of a subject existing in a corresponding one of said areas.

28. The camera system according to claim 27, further comprising an exposure control part, provided in said camera body, for controlling an exposure, wherein said exposure control part controls the exposure based on a processed result of said computing unit.

29. A method of information selection in a camera system comprising a camera body and a remote control unit capable of communications with said camera body, said method comprising:
   dividing, in said camera body, a photographing picture into a plurality of areas to detect respective pieces of information on photography in said plurality of areas;
   inputting to said camera body, from said remote control unit, a signal designating any one of said plurality of areas, independently of an existing position of said remote control unit; and
   selecting, in said camera body, a piece of information on photography in the designated area.

30. A method of information selection in a camera capable of communications with a remote control unit incorporating an area designating part for designating any area among a plurality of areas within a photographing picture, irrespective of an existing position of a photographer operating the remote control unit, said method comprising:
   dividing, in said camera, said photographing picture into a plurality of areas to detect respective pieces of information on photography in said plurality of areas; and
   inputting to said camera, from said remote control unit, a signal designating any one of said areas to select a piece of information on photography in the designated area.

31. A method of information selection in a camera system comprising a camera body and a remote control unit capable of communications with said camera body, said method comprising:
   dividing, in said camera body, a photographing picture into a plurality of areas to detect respective pieces of information on photography in said plurality of areas;
   inputting to said camera body, from said remote control unit, a signal designating at least any two areas in said plurality of areas;
   selecting, in said camera body, at least two pieces of information on photography in said at least two designated areas; and
   selecting, in said camera body, one piece of information satisfying a given condition from said at least two pieces of information.

32. A method of information selection in a camera system comprising a camera body and a remote control unit capable of communications with said camera body, said method comprising:
   dividing, in said camera body, a photographing picture into a plurality of areas to detect respective pieces of information on photography in said plurality of areas;
   inputting to said camera body, from said remote control unit, a signal designating at least any two areas in said plurality of areas; and
   selecting, in said camera body, at least two pieces of information on photography in said at least two designated areas.

33. A method of information selection in a camera system comprising a camera body and a remote control unit capable of communications with said camera body, said method comprising:
   dividing, in said camera body, a photographing picture into a plurality of areas to detect respective pieces of information on photography in said plurality of areas;
   inputting to said camera body, from said remote control unit, a signal designating at least any two areas in said plurality of areas; and
   selecting, in said camera body, at least two pieces of information on photography in said at least two designated areas.

\* \* \* \* \*

UNITED STATES PATENT AND TRADEMARK OFFICE
CERTIFICATE OF CORRECTION

PATENT NO. : 5,561,492
DATED : October 1, 1996
INVENTOR(S) : OHSAWA

It is certified that error appears in the above-indentified patent and that said Letters Patent is hereby corrected as shown below:

Title Page, Section [30], second line, "Sep. 16, 1993" should be --Sep. 6, 1993--;

Column 7, line 18, before "area" insert --components of said-- and change "means are" to --part comprise--;

Column 8, line 1, after "body" delete ",";

Column 8, line 31, "parts" should be --part--.

Signed and Sealed this

Twenty-eighth Day of January, 1997

Attest:

BRUCE LEHMAN

Attesting Officer    Commissioner of Patents and Trademarks